(12) United States Patent
Rinderknecht et al.

(10) Patent No.: US 11,794,567 B2
(45) Date of Patent: Oct. 24, 2023

(54) HYBRID DRIVE DEVICE FOR A MOTOR VEHICLE

(71) Applicant: Technische Universität Darmstadt, Darmstadt (DE)

(72) Inventors: Stephan Rinderknecht, Darmstadt (DE); Jean-Eric Schleiffer, Darmstadt (DE); Andreas Viehmann, Mainz (DE)

(73) Assignee: Technische Universität Darmstadt, Darmstadt (DE)

( * ) Notice: Subject to any disclaimer, the term of this patent is extended or adjusted under 35 U.S.C. 154(b) by 304 days.

(21) Appl. No.: 17/282,791

(22) PCT Filed: Sep. 27, 2019

(86) PCT No.: PCT/EP2019/076325
§ 371 (c)(1),
(2) Date: Oct. 15, 2021

(87) PCT Pub. No.: WO2020/070030
PCT Pub. Date: Apr. 9, 2020

(65) Prior Publication Data
US 2022/0041045 A1 Feb. 10, 2022

(30) Foreign Application Priority Data

Oct. 5, 2018 (DE) ......................... 10 2018 124 633

(51) Int. Cl.
*B60K 6/547* (2007.10)
*B60K 6/36* (2007.10)
(Continued)

(52) U.S. Cl.
CPC ................ *B60K 6/547* (2013.01); *B60K 6/36* (2013.01); *B60K 6/48* (2013.01); *F16H 3/093* (2013.01);
(Continued)

(58) Field of Classification Search
CPC . B60K 6/547; B60K 6/36; B60K 6/48; B60K 6/348; B60K 2006/4825; F16H 3/093; F16H 2200/0043
(Continued)

(56) References Cited

U.S. PATENT DOCUMENTS 5,788,006 A * 8/1998 Yamaguchi ........... B60W 10/26
                                                       903/910
10,328,817 B2 * 6/2019 Hata ..................... B60W 10/26
(Continued)

FOREIGN PATENT DOCUMENTS

DE          10232838 A1     2/2004
DE       102006036758 A1    2/2008
(Continued)

*Primary Examiner* — Ha Dinh Ho
(74) *Attorney, Agent, or Firm* — Smartpat PLC (57) ABSTRACT

A hybrid drive device for a motor vehicle with an internal combustion engine includes a first electric motor and a second electric motor. A transmission includes a first partial transmission connected to the first electric motor and a second partial transmission connected to the second electric motor, each being connectable to an output shaft. The internal combustion engine can selectively be uncoupled from the transmission or can be connected in a form-fit manner to the first or the second partial transmission. The first electric motor is connected at a constant gear ratio to a first drive shaft of the first partial transmission, and the second electric motor is connected at a constant gear ratio to a second drive shaft of the second partial transmission. The internal combustion engine can also be connected in a form-fit manner to the output shaft by way of a direct gear-change means.

22 Claims, 5 Drawing Sheets

(51) Int. Cl.
*B60K 6/48* (2007.10)
*B60K 6/387* (2007.10)
*F16H 3/093* (2006.01)

(52) U.S. Cl.
CPC ...... *B60K 6/387* (2013.01); *B60K 2006/4825* (2013.01); *B60Y 2200/92* (2013.01); *F16H 2200/0043* (2013.01)

(58) Field of Classification Search
USPC .......................................................... 74/661
See application file for complete search history.

(56) References Cited

U.S. PATENT DOCUMENTS

| | | | |
|---|---|---|---|
| 2008/0105477 A1* | 5/2008 | Abe | B60K 6/365 180/65.265 |
| 2009/0011887 A1 | 1/2009 | Komada et al. | |
| 2016/0069426 A1* | 3/2016 | Yang | B60K 6/442 180/65.23 |
| 2016/0144702 A1* | 5/2016 | Byun | F16H 3/006 180/65.23 |
| 2016/0207392 A1* | 7/2016 | Zhang | B60K 6/36 |

FOREIGN PATENT DOCUMENTS

| | | |
|---|---|---|
| DE | 102010028026 A1 | 10/2011 |
| DE | 102011117853 A1 | 5/2012 |
| DE | 102011089711 A1 | 6/2013 |
| DE | 102016002863 A1 | 9/2017 |
| EP | 1610038 A1 | 12/2005 |
| JP | 2010162924 A | 7/2010 |
| WO | 2007110721 A1 | 10/2007 |

\* cited by examiner

HYBRID DRIVE DEVICE FOR A MOTOR VEHICLE

CROSS-REFERENCE TO RELATED APPLICATION

This application is a national stage application, filed under 35 U.S.C. § 371, of International Patent Application No. PCT/EP2019/076325, filed on 2019 Sep. 27, which claims the benefit of German Patent Application No. 10 2018 124 633.1, filed 2018 Oct. 5.

TECHNICAL FIELD

The disclosure relates to a hybrid drive device for a motor vehicle with an internal combustion engine, with a first electric motor and with a second electric motor.

BACKGROUND

In the hybrid drive device for motor vehicles which is known from practice, usually at least one electric motor is combined with another energy converter in order to drive the vehicle in question. Here, in most cases electric motors are combined with an internal combustion engine in order, on the basis of the extensive experience of the past decades with internal combustion engines, to be able to combine their long range and the possibility of rapid refueling within a dense network of petrol stations with the advantages of an electric motor, which offers very high efficiency and simple possibilities of recovering energy, for example during braking operations.

One or more electric motors and an internal combustion engine may in this case both simultaneously drive an output shaft of the hybrid drive device, this being referred to as a parallel hybrid drive device. With a serial hybrid drive device, only electric motors are connected for power transmission to the output shaft, whereas with the other energy converter, usually with an internal combustion engine, part of or the full power is made available, this being transmitted to the output shaft with the electric motor. Mixed forms in which an energy converter, usually an internal combustion engine, selectively can transmit its drive power directly to the output shaft of the hybrid drive device or makes its power generated during operation available to the other energy converter, usually an electric motor, which in turn drives the output shaft of the hybrid drive device, are also known from practice. It is likewise possible for the power generated with an energy converter to be supplied to a suitable storage means, in order to be able to retrieve it again if required and use it to drive the motor vehicle.

Between the energy converters on one hand and the output shaft of the hybrid drive device which is driven thereby on the other hand, there is usually arranged a transmission with which different transmission ratios are made possible. With the transmission, on one hand starting-up of the motor vehicle from standstill and on the other hand a high travelling speed during normal driving are each made possible as efficiently as possible. Here, it is in many cases advantageous if a rotational speed of the drive shaft which is made to rotate by the energy converters in each case remains within a speed range which is advantageous for the drive device in question. Internal combustion engines for passenger vehicles are usually designed for rotational speeds in a range between approximately 800 revolutions per minute and approximately 5,000 revolutions per minute during driving operation of relatively long duration. In the case of electric motors, it is possible to design the electric motor for operation within a large speed range and in this case also to design the electric motor for a maximum rotational speed of up to 20,000 or 25,000 revolutions per minute or even more, because at high rotational speeds electric power can advantageously be converted into drive power with a high power density and hence with small electric motors. With the transmission and the transmission ratios which are made possible thereby, an attempt is made to use the energy converters used for generating the drive power, for example the internal combustion engine and the at least one electric motor, in each case within a speed range which is advantageous for the energy converter in question for generating the drive power of the motor vehicle.

In particular in the case of a drive device in which the drive power is generated not exclusively by one electric motor but by a plurality of electric motors, or optionally an internal combustion engine can temporarily or permanently be coupled into the transmission to generate the drive power, and therefore a drive power is transmitted to the transmission at different rotational speeds, it is often desirable to make the gear-change operations for changing between two transmission ratios of the transmission as short as possible and without complex operations, in order to be able to transmit as efficiently as possible a drive power which is maintained as continuously as possible or changes as steadily as possible to the output shaft of the hybrid drive device.

For example, a hybrid drive device with an electric motor and an internal combustion engine which makes possible operation purely by electric motor and also operation purely by internal combustion engine and also mixed operation, with which both the electric motor and the internal combustion engine each transmit a portion of the total drive power generated to an output shaft of the hybrid drive device, is described in DE 10 2016 002 863 A1. In this case, the internal combustion engine can optionally be connected to the transmission of the hybrid drive device with the aid of a frictional clutch and thereby the drive power of the internal combustion engine can be transmitted to the output shaft of the hybrid drive device. With the aid of the electric motor, individual gear-change operations can be supported, with the electric motor being able to replace mechanical transmission functions and to effect traction support for the internal combustion engine. The frictional clutch connects the internal combustion engine to a partial transmission, so that the internal combustion engine by way of the partial transmission at one of a plurality of transmission ratios can optionally be connected in for driving the output shaft, which can be driven continuously by the electric motor.

A hybrid drive device with two electric motors which are each connectable to the output shaft of the hybrid drive device by way of a partial transmission associated with the electric motor in question is known from DE 10 2011 117 853 A1. By using two electric motors and two partial transmissions associated with the respective electric motor, uninterruptible transmission of the drive power of the output shaft of the hybrid drive device generated by the electric motors can be made possible with this hybrid drive device. An internal combustion engine usually used as a range extender can be coupled by way of a clutch either with one of the two electric motors or alternatively directly with the output shaft of the hybrid drive device, so that both serial hybrid operation and parallel hybrid operation are possible.

The use of frictional clutches between an internal combustion engine and a transmission makes possible simple and automatic matching of the respective rotational speeds during a coupling operation, without external control and matching of the rotational speeds being absolutely necessary. However, this is often at the expense of somewhat-reduced efficiency during operation of the hybrid drive device, and in particular during the performing of gear-change operations with the friction clutch and with the synchronizing elements involved in a gear-change operation, since drag losses regularly occur in the synchronizing elements involved. By external control, for example interventions in the control system of the internal combustion engine, it is possible to attempt to reduce these disadvantages.

SUMMARY

A hybrid drive device for a motor vehicle with an internal combustion engine includes a first electric motor and a second electric motor, which are connected by way of a transmission to an output shaft of the hybrid drive device. At least two different transmission ratios between the two electric motors and the output shaft can be specified with the transmission. The transmission has a first partial transmission and second partial transmission which are each connectable to the output shaft. The first electric motor is connected to the first partial transmission and the second electric motor to the second partial transmission.

It is regarded as an object of the present invention to configure a hybrid drive device such that an efficient as possible operation of the hybrid drive device while having as small as possible a space requirement for the hybrid drive device and in particular for the transmission arranged between the individual energy converters on one hand and the output shaft on the other hand is made possible.

This object is achieved in that the internal combustion engine selectively can be uncoupled from the transmission or is connectable in a form-fit manner to at least one partial transmission. In this case, provision may optionally be made for the internal combustion engine to be able to be connected either only to the first partial transmission or only to the second partial transmission. Alternatively, for certain applications it may also be advantageous for the internal combustion engine to be connectable simultaneously to the first partial transmission and to the second partial transmission.

By dispensing with a frictional clutch and also frictional synchronizing elements for linking the internal combustion engine, comparatively efficient operation of the hybrid drive device can be made possible. In addition, the hybrid drive device can be produced comparatively inexpensively and with an extremely small necessary installation space, and integrated in a vehicle. By using two electric motors, which are each connectable to the output shaft by way of an associated first or second partial transmission, the synchronization of the respective rotational speeds necessary for a gear-change operation of the internal combustion engine can be brought about with one of the two electric motors, so no frictional clutch or synchronization is required for coupling the internal combustion engine, or for a gear-change operation in which the internal combustion engine is involved. The internal combustion engine can be connected to the output shaft by the selectively possible form-fit connection to the first partial transmission or to the second partial transmission at different transmission ratios. For specific gear-change operations, the internal combustion engine can in addition be connected to both partial transmissions. Complete decoupling of the internal combustion engine from the transmission is also possible in principle, so that driving of the motor vehicle exclusively by electric motor is made possible, which may be advantageous in certain operating situations. In this case, in the case of driving exclusively by electric motor as well, the partial transmissions and also different gear ratios can be used selectively.

By dispensing with a frictional clutch when connecting the internal combustion engine, the total installation space necessary for the hybrid drive device can be reduced compared with a hybrid drive device with a frictional clutch. Owing to the exclusively form-fit connection of the two electric motors and the internal combustion engine to the output shaft, particularly efficient transmission of the drive power generated by the electric motors and by the internal combustion engine to the output shaft is promoted. In addition, the installation space required, compared with conventional hybrid drive devices, is small and can be utilized very efficiently.

According to one advantageous configuration of the inventive concept, provision is made for the first electric motor to be connected at a constant gear ratio to a first drive shaft of the first partial transmission and for the second electric motor to be connected at a constant gear ratio to a second drive shaft of the second partial transmission. In this case, the constant gear ratio at which the first electric motor is connected to the first drive shaft of the first partial transmission and the constant gear ratio at which the second electric motor is connected to the second drive shaft of the second partial transmission may be specified either identically to each other or differently. A preferred rotational speed and the drive power of the first electric motor and of the second electric motor achievable at this speed may also be specified selectively as the same or alternatively differently. If the transmission ratios at which the first electric motor is connected to the first drive shaft and the second electric motor to the second drive shaft are specified differently, the internal combustion engine can be connected to the output shaft by a form-fit connection to either the first drive shaft or the second drive shaft likewise at a different transmission ratio by way of the partial transmission in question. The first electric motor and the second electric motor in the case of a connection at gear ratios which are different, but constant in each case, to the first partial transmission or to the second partial transmission can be operated at a differing rotational speed, but one which is particularly efficient for the electric motor in question, and nevertheless bring about different transmission ratios for the generation and transmission of the drive power to the output shaft.

According to one optional configuration of the inventive concept, provision is made for the first partial transmission and the second partial transmission in each case to make possible two different transmission ratios, which can be specified selectively with the aid of a gear-change means. In this way, with the two partial transmissions a total of four different transmission ratios for transmitting the drive power generated by the two electric motors to the output shaft can be specified. At the same time, comparatively efficient operation of the hybrid drive device thus configured can be made possible, with which the drive power can be transmitted to the output shaft with as small as possible a number of gear-wheel meshes and the number and complexity of the gear-change operations necessary for changing between the individual transmission ratios are reduced. For the gear-change operations which are possible in each case, it can be listed as a further advantage that the internal combustion engine can be connected simultaneously to both partial transmissions and accordingly can supply drive power, as a result of which, even during a change of gear of the internal combustion engine, uninterruptible transmission of drive power can be achieved with the aid of the dual clutch, which is embodied in a form-fit manner, with the assistance of the electric motors. The electric motors may be used as traction support and for rotational-speed management, in order to make possible continuous transmission of power from the internal combustion engine to the output shaft.

According to one particularly advantageous configuration of the inventive concept, provision is made for the first electric motor to be connectable to the output shaft of the transmission by way of the first partial transmission by way of only two gear-wheel meshes, and for the second electric motor to be connectable to the output shaft of the transmission by way of the second partial transmission by way of only two gear-wheel meshes. The internal combustion engine can also be connected to the output shaft by way of only two gear-wheel meshes. Owing to the possibility of being able to connect the two electric motors to the output shaft with a total of four different transmission ratios with only two gear-wheel meshes, great advantages are yielded with regard to the improved efficiency of the hybrid drive device and also the considerably smaller space requirement compared with conventional hybrid drive devices. The hybrid drive device permits an extremely compact configuration of the transmission and of the arrangement of the two electric motors in the vicinity of the internal combustion engine. As a result, the hybrid drive device can also be used in motor vehicles in which the specifications and limitations of the available installation space would not permit conventional hybrid drive devices, or would allow only hybrid drive device with a considerably restricted range of functions.

The range of functions of the hybrid drive device can optionally be extended in the case of a coaxial arrangement of the drive and output in that the internal combustion engine is connectable to the output shaft of the transmission in a form-fit manner with a direct gear-change means. By a form-fit connection of the internal combustion engine to the output shaft, particularly efficient transmission of the drive power generated by the internal combustion engine to the output shaft of the transmission and hence to the driven wheels of the motor vehicle is made possible. In this way, with merely one further gear-change means, the direct gear-change means, the range of functions of the hybrid drive device is additionally extended and direct transmission of the drive power from the internal combustion engine to the output shaft is made possible. The direct gear-change means may also be configured as an additionally possible further gear-change position of a gear-change means which is already present.

Optionally, a particularly space-saving and structurally simple direct gear-change means is made possible in that the direct gear-change means with the aid of a suitably formed sliding sleeve makes possible a form-fit engagement with a first output gear wheel connected non-rotatably to the output shaft, with the form-fit engagement taking place by way of at least one cut-out or shaping in a gear wheel disc of a second output gear wheel. By extending through a first output gear wheel, with which the drive power is transmitted from the first partial transmission or from the second partial transmission to the output shaft, space-saving, form-fit through-passage through the internal combustion engine output shaft onto the output shaft of the hybrid drive device can be made possible with the direct gear-change means.

It is in principle possible, but not absolutely necessary, for the internal combustion engine, for example to protect from overloading of the internal combustion engine or of the transmission, to be connected to the transmission by way of an additional frictional clutch.

Below, various exemplary embodiments of the inventive concept will be explained by way of example with reference to the drawings, these examples being illustrated schematically in the drawings.

DETAILED DESCRIPTION

Figure 8:
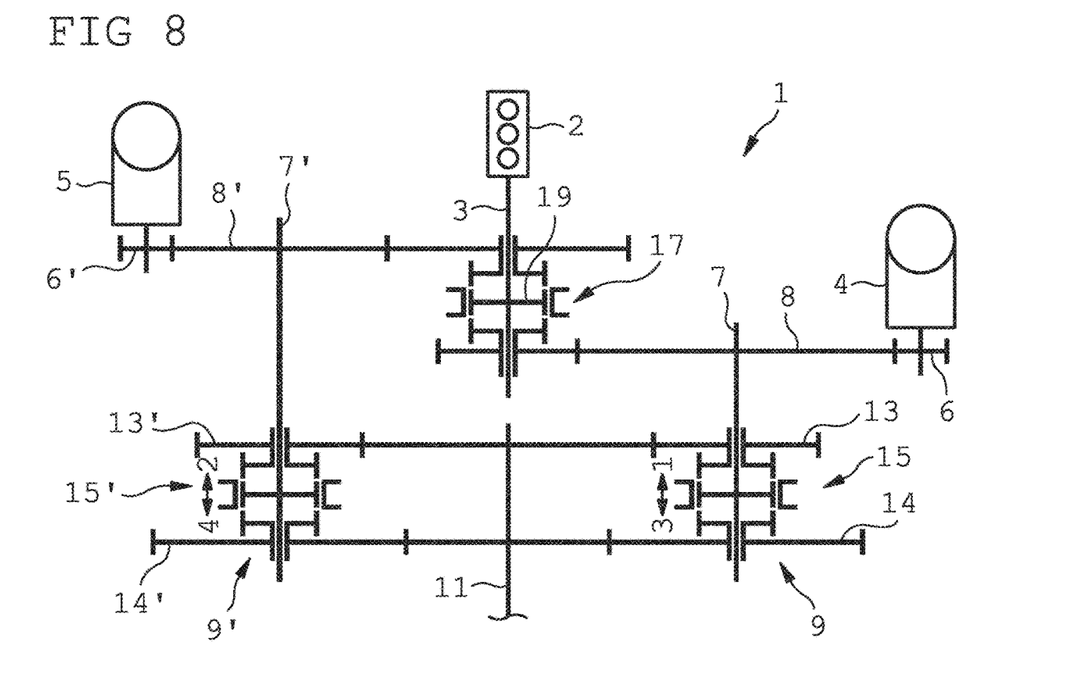
FIG. 8 is a schematic functional representation of a differently-configured hybrid drive device with an internal combustion engine arranged in a vehicle as a longitudinal engine.
Figure 9:
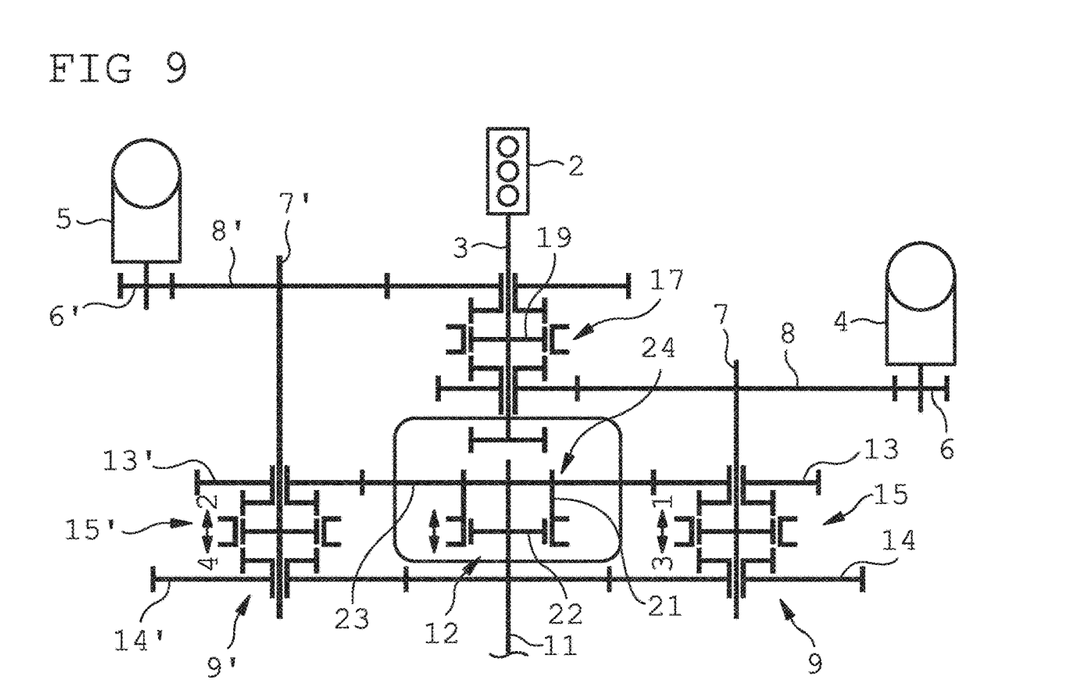
FIG. 9 is a schematic functional representation of a differently-configured hybrid drive device with an internal combustion engine arranged in a vehicle as a longitudinal engine, with the internal combustion engine being able to be connected in a form-fit manner directly to the output shaft.
Figure 10:
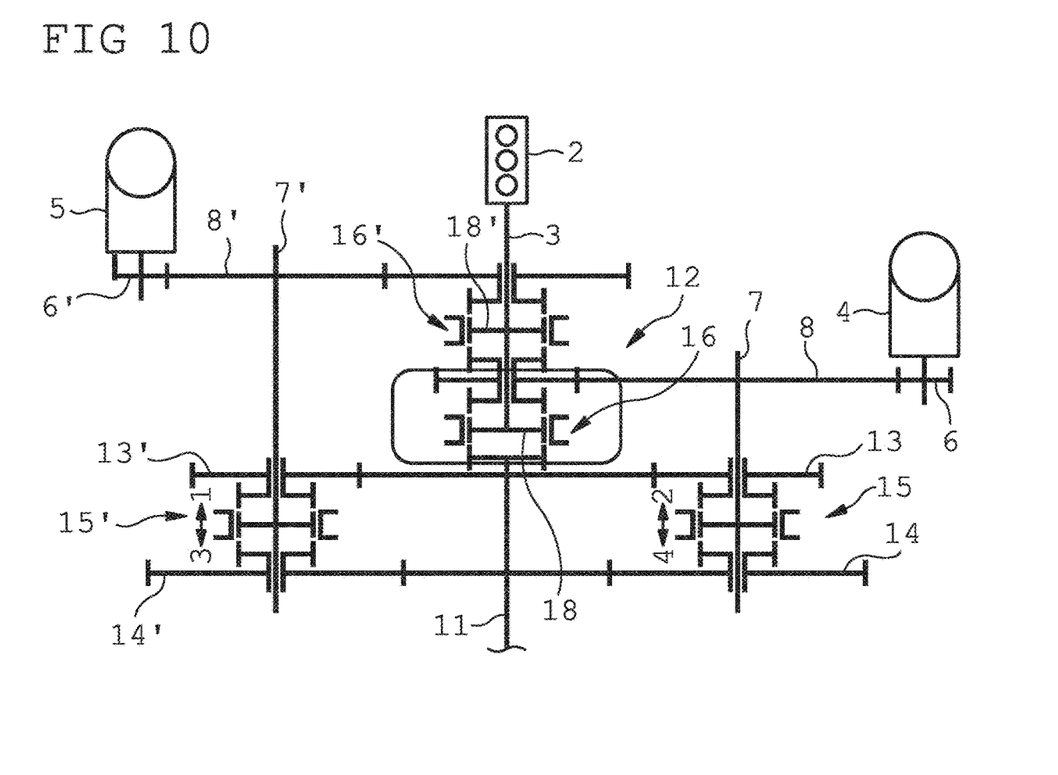
FIG. 10 is a schematic functional representation of an again differently-configured hybrid drive device with an internal combustion engine arranged in a vehicle as a longitudinal engine, with the internal combustion engine being able to be connected in a form-fit manner to one partial transmission in each case by way of two gear-change units, as a result of which particularly simple and fast gear-change operations are made possible.

FIGS. 1, 4, 6 and 7 in each case schematically illustrate hybrid drive devices 1 with an internal combustion engine 2, which engine is arranged in the vehicle as a transverse engine and has an internal combustion engine drive train 3 which is oriented transversely to the direction of travel. FIGS. 8, 9 and 10 schematically illustrate hybrid drive devices 1 with an internal combustion engine 2, which engine is arranged in the vehicle as a longitudinal engine and has an internal combustion engine drive train 3 which is arranged in the longitudinal direction parallel to the direction of travel. The advantages of the hybrid drive device 1, namely a particularly compact and space-saving design with exclusively form-fitting gear-change elements which can be operated without drag torques or without energy necessary for keeping friction clutches closed, and operation of the hybrid drive device 1 which takes place with few gear-wheel meshes and therefore is particularly efficient, can be realized and achieved with both variants of the motor arrangement in the motor vehicle.

In all the variant embodiments illustrated by way of example, the hybrid drive device 1 has a first electric motor 4 and a second electric motor 5 which are each engaged, by way of a gear-wheel mesh of a gear wheel 6, 6' which is connected non-rotatably to the electric motor 4, 5 in question, with a gear wheel 8, 8' which is connected non-rotatably to a first or second drive shaft 7, 7', respectively. A torque generated by the respective electric motor 4, 5 is transmitted by way of the respective gear-wheel mesh to the associated first or second drive shaft 7, 7' respectively of a first or second partial transmission 9, 9' respectively. In this case, the gear-wheel meshes have a transmission ratio which is constant in each case, so that the first electric motor 4 is connected at a constant gear ratio to the first drive shaft 7 of the first partial transmission 9, and the second electric motor 5 is connected at a constant gear ratio to a second drive shaft 7' of the second partial transmission 9'. The transmission ratio which is constant in each case may, depending on requirements, be of the same size or alternatively optionally clearly different. The first electric motor 4 and the second electric motor 5 may also be specified to be the same or optionally clearly different, for example with regard to the preferred number of revolutions and the drive power. It is likewise possible that the two electric motors 4, 5, in a departure from the exemplary embodiments illustrated, may not be connected at a constant transmission ratio to the first or second drive shaft 7, 7' respectively of the two partial transmissions 9, 9'.

In the hybrid drive devices 1 illustrated in FIGS. 1 to 7 with the internal combustion engine 2 arranged as a transverse engine, the two drive shafts 7, 7' of the two partial transmissions 9, 9' are connected to an output shaft 11 of the hybrid drive device 1 by way of a differential 10. In this case, gear-wheel meshes of the two partial transmissions 9, 9' are realized by way of jointly-utilized differential wheels of the differential 10 which may be embodied identically or differently. The differential 10 is arranged in FIGS. 1, 4, 6 and 7 from the viewing direction behind further gear-change elements or components of the hybrid drive device 1, and therefore is illustrated only supposedly overlaying and also for clarification in broken lines.

In the case of an arrangement of the internal combustion engine 2 as a longitudinal engine, as is illustrated in the exemplary embodiments in FIGS. 9 and 10, the output shaft 11 can be arranged coaxially with the internal combustion engine output shaft 3 and in this case be connected selectively in a form-fit manner to the internal combustion engine output shaft 3 by way of a direct gear-change means 12.

In all the exemplary embodiments illustrated, the two partial transmissions 9, 9' have a first partial-transmission gear wheel 13, 13' and a second partial-transmission gear wheel 14, 14' which is configured differently therefrom, with which gear wheels different transmission ratios can be specified in the respective partial transmissions 9, 9'. With a suitably configured form-fitting gear-change means 15, 15', selectively the first partial-transmission gear wheel 13, 13' or the second partial-transmission gear wheel 14, 14' or neither of the two partial-transmission gear wheels 13, 13', 14, 14' can be connected to the respective drive shaft 7, 7' of the two partial transmissions 9, 9' which transmits the drive power of the electric motor 4, 5 associated in each case to the partial transmission 9, 9' in question. With a suitable design of the electric motors 4, 5 and of the two partial transmissions 9, 9', in this way four different transmission ratios can be made possible for transmitting the drive power of one of the two electric motors 4, 5 to the output shaft 11 of the hybrid drive device 1, which ratios can be specified selectively by corresponding actuation of the gear-change means 15, 15'. In this case, the different transmission ratios may cover a range of for example approximately 20:1 to 7:1 or 3:1. It would likewise be possible with further partial-transmission gear wheels and gear-change means additionally to specify further transmission ratios and to make them possible for operation of the hybrid drive device 1.

Figure 1:
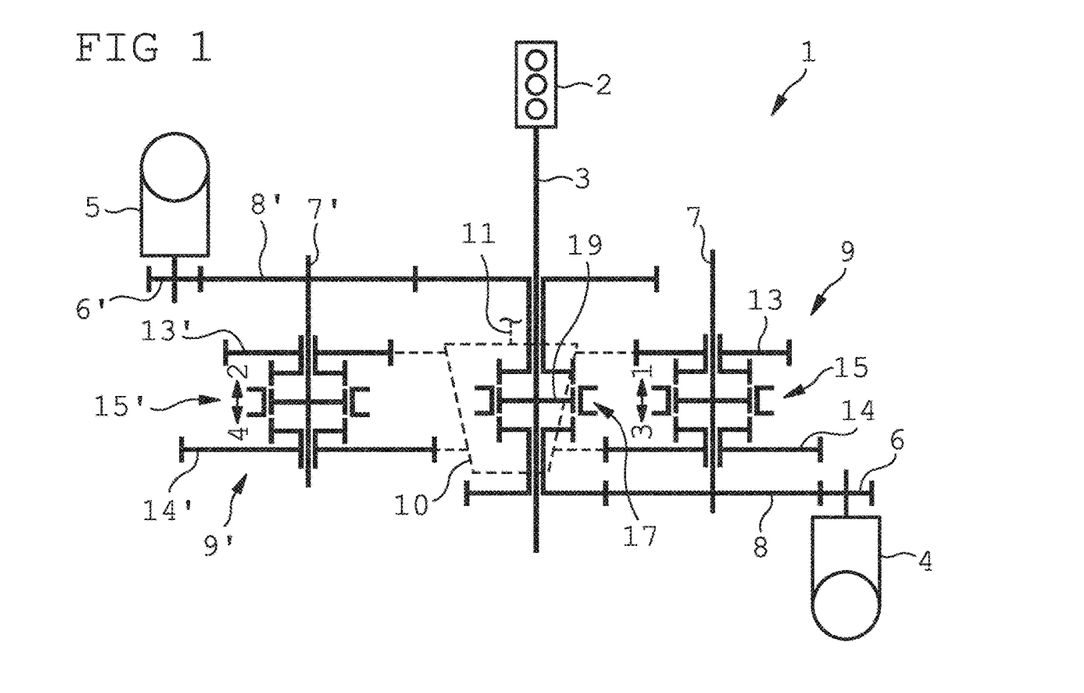
FIG. 1 is a schematic functional representation of a hybrid drive device with an internal combustion engine arranged in a vehicle as a transverse engine and with two electric motors, which are each connected in a form-fit manner to an output shaft by way of a transmission.

In the exemplary embodiment illustrated in FIG. 1, the internal combustion engine 2 is connectable selectively, by way of a gear-change means 17 which makes two form-fit connections possible, in a form-fit manner to one of the two partial transmissions 9, 9'. In the exemplary embodiments illustrated in FIG. 4 and also 6 and 7, the internal combustion engine 2 is connectable in each case selectively in a form-fit manner to one of the two partial transmissions 9, 9' or alternatively to both partial transmissions 9, 9' by way of two separate internal combustion engine gear-change means 16, 16'. In this case, in each case a form-fit engagement between a clutch body fastened to the respective gear wheel either with one of two sliding-sleeve holders 18, 18' of the internal combustion engine gear-change means 16, 16' or with a jointly-utilized sliding-sleeve holder 19 of the gear-change means 17 or the combined gear-change means 17' illustrated in greater detail in FIG. 5 is used for the power transmission. With the gear-change means 17 illustrated for example in FIG. 1, with a sliding sleeve selectively a form-fit engagement between the jointly-utilized sliding-sleeve holder 19 and one of both adjoining clutch bodies which are associated in each case with a gear wheel can be brought about. With the aid of two sliding sleeves, in the case of the combined gear-change means 17' selectively a form-fit engagement between the jointly-utilized sliding-sleeve holder 19 and one or alternatively both adjoining clutch bodies which are associated in each case with a gear wheel can be brought about. In this case, a total of four different transmission ratios can be realized in a range of for example 12:1 to 3:1 by a suitable gear-change specification. In all the exemplary embodiments illustrated by way of example, the internal combustion engine 2 can be decoupled from the two partial transmissions 9, 9' as well by a corresponding gear-change specification.

In all the variant embodiments illustrated by way of example, the form-fit connection of the internal combustion engine 2 to the output shaft 11 of the hybrid drive device 1 takes place either by way of no gear-wheel mesh or by way of two gear-wheel meshes. Thus both the drive power generated electrically with the electric motors 4, 5 and the drive power generated with the internal combustion engine 2 can each be transmitted to the output shaft 11 with at most two gear-wheel meshes. Owing to the small number of gear-wheel meshes, a particularly space-saving configuration and arrangement of the hybrid drive device 1 is possible. At the same time, also particularly efficient operation of the hybrid drive device is made possible.

Figure 2:
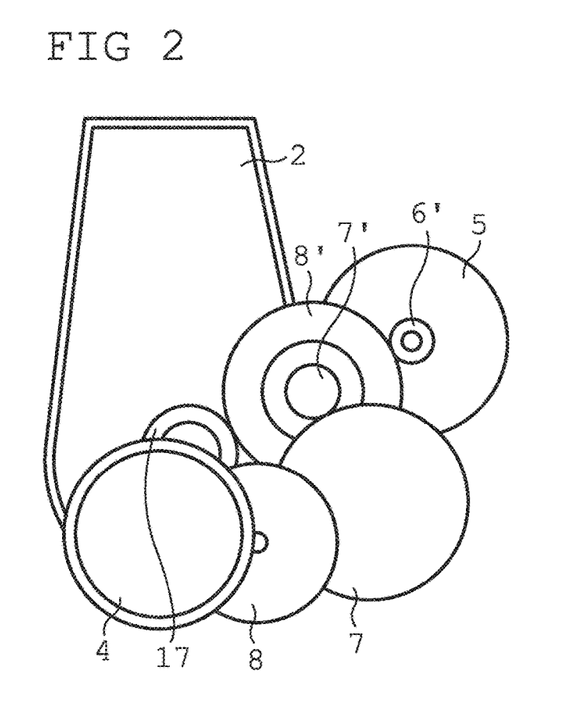
FIG. 2 is a schematic structural representation of the hybrid drive device shown in FIG. 1 in a side view of an example of an installation situation in a vehicle.
Figure 3:
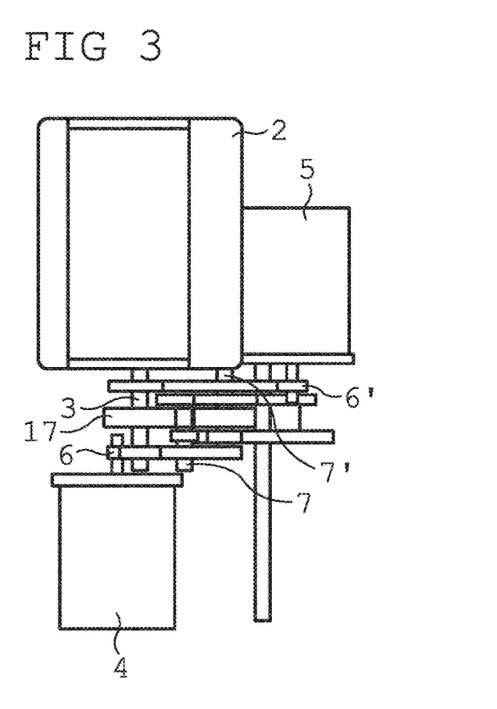
FIG. 3 is a schematic structural representation of the hybrid drive device shown in FIG. 1 in a top view of an example of an installation situation in a vehicle.

In the exemplary embodiment illustrated in FIGS. 1 to 3, the internal combustion engine 2 is connectable by way of the gear-change means 17 selectively to one of the two gear wheels 8, 8', by way of which the two electric motors 4, 5 are also connected to the respective partial transmission 9, 9'. At least one electric motor 4 can in this case often be arranged in a space-saving manner in the immediate vicinity of the internal combustion engine 2. The two electric motors 4, 5 in the exemplary embodiment illustrated in FIGS. 1 to 3 are oriented in opposite directions. The arrangement of the individual components of the hybrid drive device 1 according to the configuration illustrated in FIG. 1 is illustrated by way of example in FIGS. 2 and 3.

Figure 4:
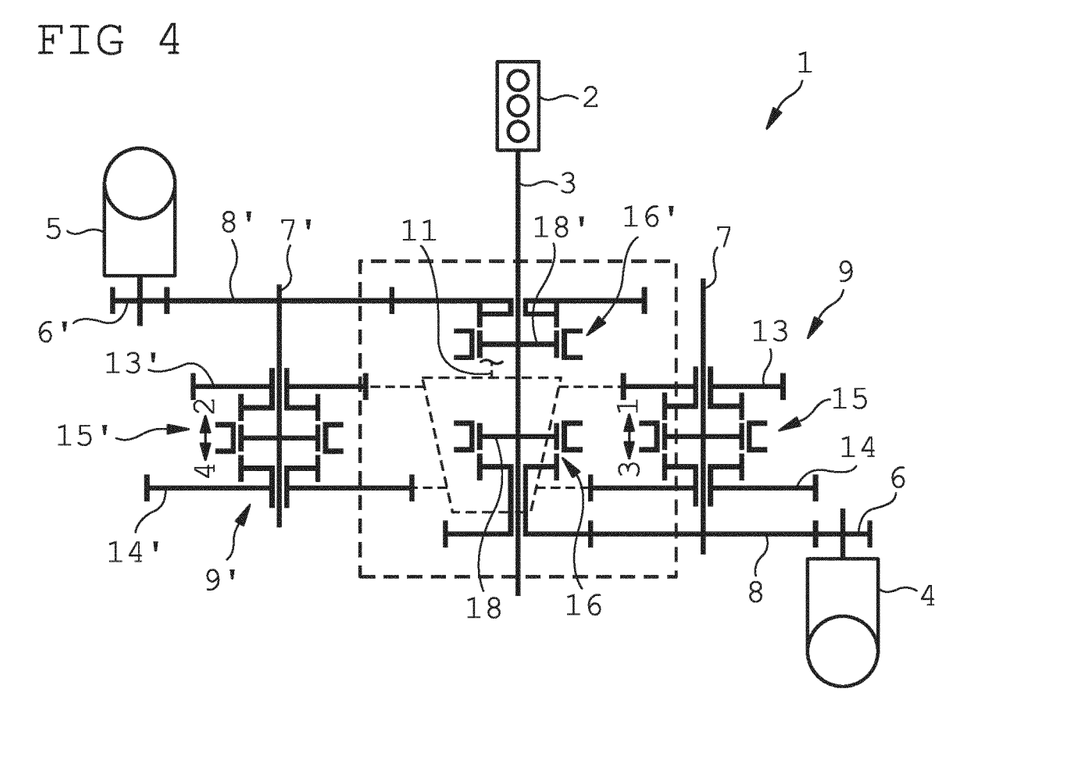
FIG. 4 is a schematic functional representation of a differently-configured hybrid drive device with an internal combustion engine arranged in a vehicle as a transverse engine.
Figure 5:
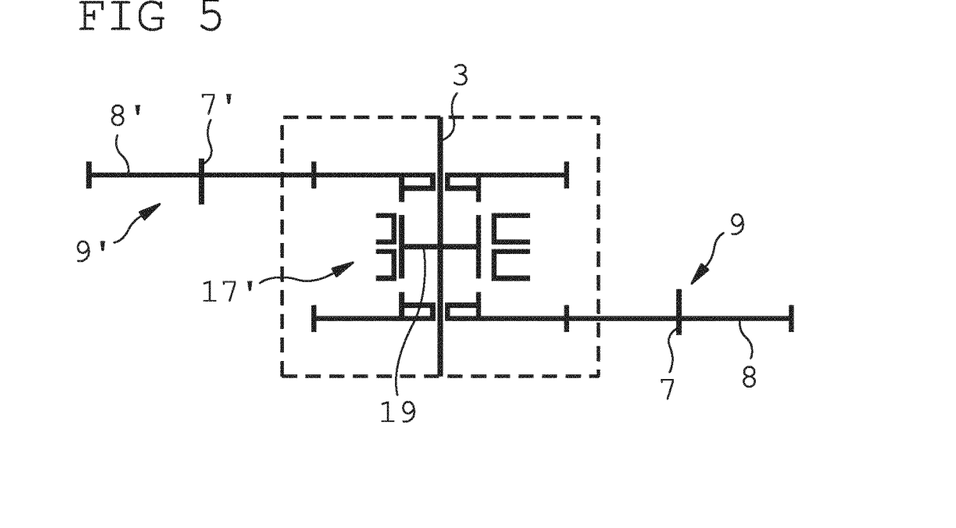
FIG. 5 is a schematic functional representation of a combined gear-change unit with a gear-change element which can be shifted into four different gear-change states, which unit can be used instead of two separate gear-change units in the hybrid drive device illustrated in FIG. 4.

In the exemplary embodiment illustrated in FIG. 4, the internal combustion engine 2 is connectable selectively to one or to both partial transmissions 9, 9' not by way of one gear-change means 17, but by way of two separately arranged shiftable gear-change means 16, 16'. A form-fit connection which can be produced selectively with one or with both partial transmissions 9, 9' can also be made possible by way of a combined gear-change means 17' used instead of the two separate gear-change means 16, 16', as is illustrated schematically in FIG. 5. The combined gear-change means 17' makes the functionality possible like two separately-arranged selectable gear-change means 16 and 16', but has only one jointly-utilized sliding-sleeve holder 19. In this case, depending on the design configuration and implementation, with the gear-change means 17 either selectively a form-fit connection to the first partial transmission 9 or to the second partial transmission 9' may take place, as illustrated in FIG. 1, or alternatively with the combined gear-change means 17' illustrated in FIG. 5 selectively a form-fit connection to the first partial transmission 9, to the second partial transmission 9' or to both partial transmissions 9, 9' can take place simultaneously.

Figure 6:
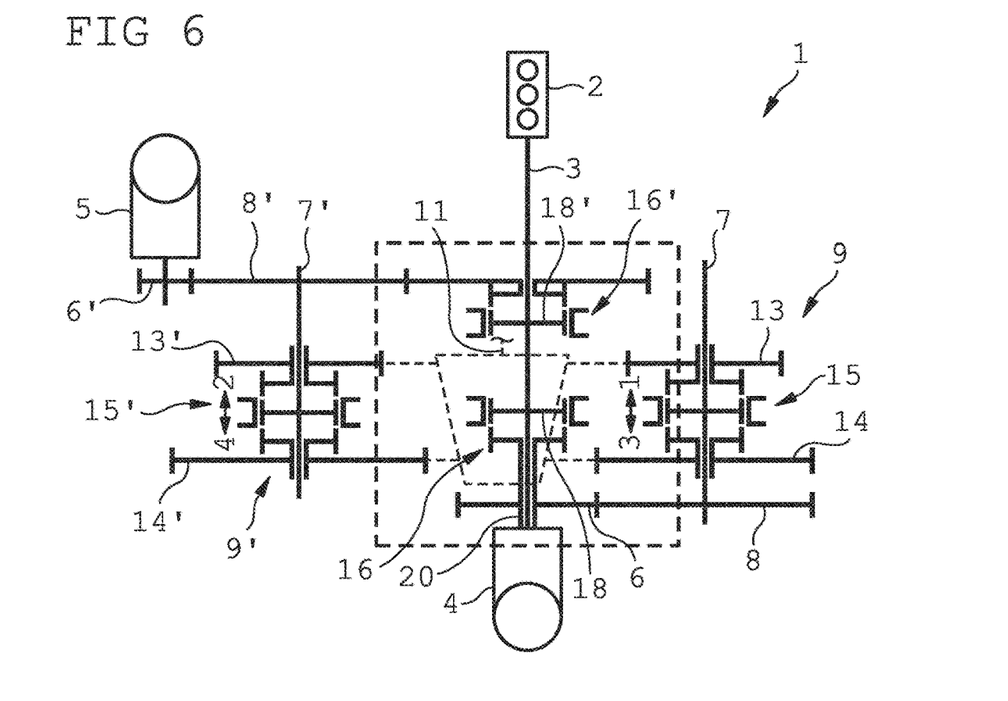
FIG. 6 is a schematic functional representation of an again differently-configured hybrid drive device with an internal combustion engine arranged in a vehicle as a transverse engine.

In the exemplary embodiment illustrated in FIG. 6, the first electric motor 4 is configured as a disc-type motor and is arranged in an extension of the internal combustion engine drive train 3. A differently-configured electric motor 4 can also be used instead of a disc-type motor. The internal combustion engine 2 can be connected selectively by way of two separate gear-change means 16, 16' or by way of a combined gear-change means 17' not illustrated separately in FIG. 6 either to a gear wheel 8' of the second partial transmission 9' or to an output shaft 20 of the electric motor 4. As a result, a particularly space-saving arrangement of the two different electric motors 4, 5 and of the entire hybrid drive device 1 can be made possible. When using an electric motor 4 which has the same speed range as the internal combustion engine 2, a saving on additional gear wheels can be effected by this arrangement.

Figure 7:
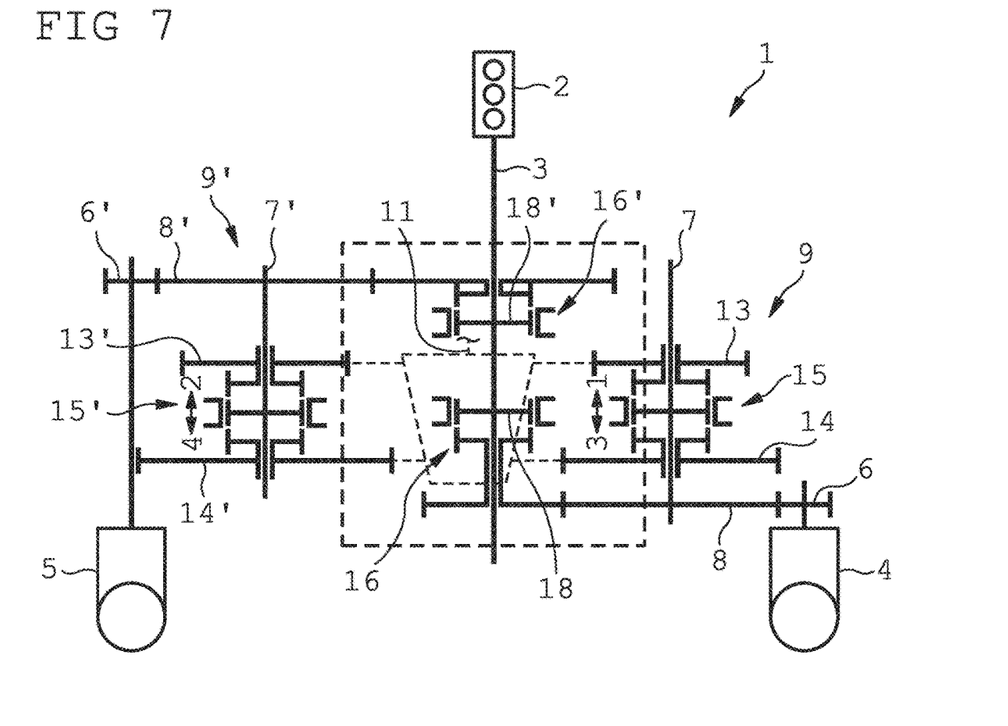
FIG. 7 is a schematic functional representation of an again differently-configured hybrid drive device with an internal combustion engine arranged in a vehicle as a transverse engine.

In the exemplary embodiment illustrated in FIG. 7, the two electric motors 4, 5 are arranged with the same orientation and rotating in the same direction. Such an arrangement of the two electric motors 4, 5 may for example be advantageous when there is no space available for arranging the electric motors 4, 5 in the immediate vicinity of the internal combustion engine 2.

In the exemplary embodiment illustrated in FIG. 8, the internal combustion engine 2 is arranged in the vehicle as a longitudinal engine. The internal combustion engine output shaft 3 can be connected by way of a gear-change means 17 selectively to the gear wheel 8 of the first partial transmission 9 or to the gear wheel 8' of the second partial transmission 9'. The form-fit connection of the internal combustion engine 2 can utilize the transmission ratios of the two partial transmissions 9, 9' and be connected by way of a total of four different transmission ratios in a form-fit manner to the output shaft 11 of the hybrid drive device 1. With a suitable arrangement of the two electric motors 4, 5, which in the exemplary embodiment shown are arranged rotating equidirectionally and with the same orientation in the immediate vicinity of the internal combustion engine 2, particularly efficient utilization of space and a concomitant small space requirement for the hybrid drive device 1 can be achieved.

In the exemplary embodiment shown in FIG. 9, in which the internal combustion engine 2 is likewise arranged as a longitudinal engine and the internal combustion engine output shaft 3 is arranged in alignment with the output shaft 11 of the hybrid drive device 1, the internal combustion engine output shaft 3 can additionally be connected directly to the output shaft 11 of the hybrid drive device 1 with a direct gear-change means 12 without taking a circuitous route via a partial transmission 9, 9'.

In the exemplary embodiment illustrated in FIG. 10, of a hybrid drive device 1 with an internal combustion engine 2 which again is arranged as a longitudinal engine, the direct gear-change means 12 is functionally integrated substantially in one of the two gear-change means 16 for the form-fit connection of the internal combustion engine output shaft 3 to the associated partial transmission 9. As a result, advantages with regard to the number of sequence steps necessary for controlling the gear-change operation of the internal combustion engine 2 and also to the total necessary gear-change duration of a gear-change operation can be obtained. One essential advantage consists in the possibility of being able to activate a partial transmission for a transfer time simultaneously from two gear-change elements.

The invention claimed is:

1. A hybrid drive device (1) for a motor vehicle, comprising:
    an internal combustion engine (2);
    a first electric motor (4);
    a first pinion gear (6) arranged on a shaft of the first electric motor (4);
    a second electric motor (5);
    a second pinion gear (6') arranged on shaft of the second electric motor (5);
    a transmission, comprising
        a first partial transmission (9) having
            a first drive shaft (7),
            a first input gear (8) mounted on the first drive shaft (7),
            a first small output gear (13), and
            a first large output gear (14), the first small output gear (13) and the first large output gear (14) being selectively coupleable to the first drive shaft (7), and
        a second partial transmission (9') having
            a second drive shaft (7'),
            a second input gear (8') mounted on second drive shaft (7'),
            a second small output gear (13'), and
        a second large output gear (14'), the second small output gear (13') and the second large output gear (14') being selectively coupleable to the second drive shaft (7');
    and an output shaft (11) of the hybrid drive device (1), the output shaft (11) being
        coupled to the first partial transmission (9) by a gear-wheel mesh with the first small output gear (13) and by a gear-wheel mesh with the first large output gear (14) and being
        coupled to the second partial transmission (9') by a gear-wheel mesh with the second small output gear (13') and by a gear-wheel mesh with the second large output gear (14'), wherein at least two different transmission ratios between the two electric motors (4, 5) and the output shaft (11) can be specified with the transmission, wherein the first electric motor (4) is connected to the first partial transmission (9) by a gear-wheel mesh of the first pinion gear (6) with the first input gear (8), and wherein the second electric motor (5) is connected to the second partial transmission (9') by a gear-wheel mesh of the second pinion gear (6') with the second input gear (8'), and wherein the internal combustion engine (2) can be selectively uncoupled from the transmission or coupled to at least one partial transmission (9, 9'), and wherein the internal combustion engine (2) is connectable simultaneously to the first partial transmission (9) and to the second partial transmission (9').

2. The hybrid drive device (1) according to claim 1, wherein the internal combustion engine (2) is connectable either to the first partial transmission (9) or to the second partial transmission (9').

3. The hybrid drive device (1) according to claim 1, wherein the first electric motor (4) is connected at a constant gear ratio to the first drive shaft (7) of the first partial transmission (9), and wherein the second electric motor (5) is connected at a constant gear ratio to the second drive shaft (7') of the second partial transmission (9').

4. The hybrid drive device (1) according to claim 3, wherein the internal combustion engine (2) is connectable in a form-fit manner to the first drive shaft (7) of the first partial transmission (9) or to the second drive shaft (7') of the second partial transmission (9').

5. The hybrid drive device (1) according to claim 1, wherein the first partial transmission (9) and the second partial transmission (9') each make possible two different transmission ratios which can be specified selectively by means of a gear-change means (15, 15').

6. The hybrid drive device (1) according to claim 1, wherein the internal combustion engine (2) is connectable to the output shaft (11) of the transmission in a form-fit manner with a direct gear-change means (12).

7. The hybrid drive device (1) according to claim 1, wherein the internal combustion engine (2) can be selectively coupled directly to the output shaft (11).

8. The hybrid drive device (1) according to claim 1, wherein the internal combustion engine (2) can be selectively coupled either
to the first partial transmission (9) by a gear-wheel mesh with the first input gear (8) or
to the second partial transmission (9') by a gear-wheel mesh with the second input gear (8').

9. The hybrid drive device (1) according to claim 1, wherein the internal combustion engine (2) can be selectively coupled to the output shaft
without intermeshing gears by a sliding sleeve (16), or
by the first partial transmission (9) through a first gear-wheel mesh with the first input gear (8) and a second gear-wheel mesh with either the first small output gear (13) or the first large output gear (14), or
by the second partial transmission (9') through a first gear-wheel mesh with the second input gear (8') and a second gear-wheel mesh with either the second small output gear (13') or the second large output gear (14').

10. A hybrid drive device (1) for a motor vehicle, comprising:
an internal combustion engine (2);
a first electric motor (4);
a first pinion gear (6) arranged on a shaft of the first electric motor (4);
a second electric motor (5);
a second pinion gear (6') arranged on shaft of the second electric motor (5);
a transmission, comprising
a first partial transmission (9) having
a first drive shaft (7),
a first input gear (8) mounted on the first drive shaft (7),
a first small output gear (13), and
a first large output gear (14), the first small output gear (13) and the first large output gear (14) being selectively coupleable to the first drive shaft (7), and
a second partial transmission (9') having
a second drive shaft (7'),
a second input gear (8') mounted on second drive shaft (7'),
a second small output gear (13'), and
a second large output gear (14'), the second small output gear (13') and the second large output gear (14') being selectively coupleable to the second drive shaft (7');
and an output shaft (11) of the hybrid drive device (1), the output shaft (11) being
coupled to the first partial transmission (9) by a gear-wheel mesh with the first small output gear (13) and by a gear-wheel mesh with the first large output gear (14) and being
coupled to the second partial transmission (9') by a gear-wheel mesh with the second small output gear (13') and by a gear-wheel mesh with the second large output gear (14'), wherein at least two different transmission ratios between the two electric motors (4, 5) and the output shaft (11) can be specified with the transmission,
wherein the first electric motor (4) is connected to the first partial transmission (9) by a gear-wheel mesh of the first pinion gear (6) with the first input gear (8), and
wherein the second electric motor (5) is connected to the second partial transmission (9') by a gear-wheel mesh of the second pinion gear (6') with the second input gear (8'), and
wherein the internal combustion engine (2) can be selectively uncoupled from the transmission or coupled to at least one partial transmission (9, 9'), and
wherein the internal combustion engine (2) can be selectively coupled directly to the output shaft (11).

11. The hybrid drive device (1) according to claim 10, wherein the internal combustion engine (2) is connectable either to the first partial transmission (9) or to the second partial transmission (9').

12. The hybrid drive device (1) according to claim 10, wherein the internal combustion engine (2) is connectable simultaneously to the first partial transmission (9) and to the second partial transmission (9').

13. The hybrid drive device (1) according to claim 10, wherein the first electric motor (4) is connected at a constant gear ratio to the first drive shaft (7) of the first partial transmission (9), and
wherein the second electric motor (5) is connected at a constant gear ratio to the second drive shaft (7') of the second partial transmission (9').

14. The hybrid drive device (1) according to claim 13, wherein the internal combustion engine (2) is connectable in a form-fit manner to the first drive shaft (7) of the first partial transmission (9) or to the second drive shaft (7') of the second partial transmission (9').

15. The hybrid drive device (1) according to claim 10, wherein the first partial transmission (9) and the second partial transmission (9') each make possible two different transmission ratios which can be specified selectively by means of a gear-change means (15, 15').

16. The hybrid drive device (1) according to claim 10, wherein the internal combustion engine (2) is connectable to the output shaft (11) of the transmission in a form-fit manner with a direct gear-change means (12).

17. The hybrid drive device (1) according to claim 10, wherein the internal combustion engine (2) can be selectively coupled either
   to the first partial transmission (9) by a gear-wheel mesh with the first input gear (8) or
   to the second partial transmission (9') by a gear-wheel mesh with the second input gear (8').

18. The hybrid drive device (1) according to claim 10, wherein the internal combustion engine (2) can be selectively coupled to the output shaft without intermeshing gears by a sliding sleeve (16), or
   by the first partial transmission (9) through a first gear-wheel mesh with the first input gear (8) and a second gear-wheel mesh with either the first small output gear (13) or the first large output gear (14), or
   by the second partial transmission (9') through a first gear-wheel mesh with the second input gear (8') and a second gear-wheel mesh with either the second small output gear (13') or the second large output gear (14').

19. A hybrid drive device (1) for a motor vehicle, comprising:
   an internal combustion engine (2);
   a first electric motor (4);
   a first pinion gear (6) arranged on a shaft of the first electric motor (4);
   a second electric motor (5);
   a second pinion gear (6') arranged on shaft of the second electric motor (5);
   a transmission, comprising
      a first partial transmission (9) having
         a first drive shaft (7),
         a first input gear (8) mounted on the first drive shaft (7),
         a first small output gear (13), and
         a first large output gear (14), the first small output gear (13) and the first large output gear (14) being selectively coupleable to the first drive shaft (7), and
      a second partial transmission (9') having
         a second drive shaft (7'),
         a second input gear (8') mounted on second drive shaft (7'),
         a second small output gear (13'), and
   a second large output gear (14'), the second small output gear (13') and the second large output gear (14') being selectively coupleable to the second drive shaft (7');
   and an output shaft (11) of the hybrid drive device (1), the output shaft (11) being
      coupled to the first partial transmission (9) by a gear-wheel mesh with the first small output gear (13) and by a gear-wheel mesh with the first large output gear (14) and being
   coupled to the second partial transmission (9') by a gear-wheel mesh with the second small output gear (13') and by a gear-wheel mesh with the second large output gear (14'), wherein at least two different transmission ratios between the two electric motors (4, 5) and the output shaft (11) can be specified with the transmission,
   wherein the first electric motor (4) is connected to the first partial transmission (9) by a gear-wheel mesh of the first pinion gear (6) with the first input gear (8), and
   wherein the second electric motor (5) is connected to the second partial transmission (9') by a gear-wheel mesh of the second pinion gear (6') with the second input gear (8'), and
   wherein the internal combustion engine (2) can be selectively uncoupled from the transmission or coupled to at least one partial transmission (9, 9'), and
   wherein the internal combustion engine (2) can be selectively coupled to the output shaft
      without intermeshing gears by a sliding sleeve (16), or
      by the first partial transmission (9) through a first gear-wheel mesh with the first input gear (8) and a second gear-wheel mesh with either the first small output gear (13) or the first large output gear (14), or
      by the second partial transmission (9') through a first gear-wheel mesh with the second input gear (8') and a second gear-wheel mesh with either the second small output gear (13') or the second large output gear (14').

20. The hybrid drive device (1) according to claim 19, wherein the first electric motor (4) is connected at a constant gear ratio to the first drive shaft (7) of the first partial transmission (9), and
   wherein the second electric motor (5) is connected at a constant gear ratio to the second drive shaft (7') of the second partial transmission (9').

21. The hybrid drive device (1) according to claim 19, wherein the internal combustion engine (2) is connectable simultaneously to the first partial transmission (9) and to the second partial transmission (9').

22. The hybrid drive device (1) according to claim 19, wherein the first partial transmission (9) and the second partial transmission (9') each make possible two different transmission ratios which can be specified selectively by means of a gear-change means (15, 15').

* * * * *